US010527468B2

(12) United States Patent
Dykstra et al.

(10) Patent No.: US 10,527,468 B2
(45) Date of Patent: Jan. 7, 2020

(54) MONITORING SENSOR AND ACTUATOR HEALTH IN A MUD CIRCULATION SYSTEM

(71) Applicant: Halliburton Energy Services, Inc., Houston, TX (US)

(72) Inventors: Jason D. Dykstra, Spring, TX (US); Zhijie Sun, Spring, TX (US); Xiaoqing Ge, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 352 days.

(21) Appl. No.: 15/324,135

(22) PCT Filed: Jul. 13, 2016

(86) PCT No.: PCT/US2016/042004
§ 371 (c)(1),
(2) Date: Jan. 5, 2017

(87) PCT Pub. No.: WO2017/011509
PCT Pub. Date: Jan. 19, 2017

(65) Prior Publication Data
US 2017/0211954 A1 Jul. 27, 2017

Related U.S. Application Data

(60) Provisional application No. 62/191,923, filed on Jul. 13, 2015.

(51) Int. Cl.
*G06F 11/30* (2006.01)
*G01D 18/00* (2006.01)
(Continued)

(52) U.S. Cl.
CPC ............ *G01D 18/00* (2013.01); *E21B 21/01* (2013.01); *G01V 11/002* (2013.01)

(58) Field of Classification Search
CPC ..................................................... G01D 18/00
See application file for complete search history.

(56) References Cited

U.S. PATENT DOCUMENTS

2002/0148646 A1   10/2002   Schultz et al.
2010/0023269 A1*  1/2010   Yusti ...................... E21B 43/00
                                                             702/12

(Continued)

FOREIGN PATENT DOCUMENTS

WO    2008104750 A1   9/2008
WO    2014085935 A1   6/2014
(Continued)

OTHER PUBLICATIONS

ISR/WO for PCT/US2016/042004 dated Oct. 21, 2016.

*Primary Examiner* — Phuong Huynh
(74) *Attorney, Agent, or Firm* — Gilliam IP PLLC

(57) ABSTRACT

Two control strategies may be implemented to optimize mud circulation in a drilling mud circulation system. In a networked control strategy, the mud circulation system does not involve any centralized controller yet all the local controllers can exchange information in real-time via a central data storage. The master-slave control strategy involves a centralized optimizer, and the subsystems are treated as slave systems and are driven by a visual master control system.

19 Claims, 8 Drawing Sheets

(51) Int. Cl.
*E21B 21/01* (2006.01)
*G01V 11/00* (2006.01)

(56) References Cited

U.S. PATENT DOCUMENTS

2014/0231141 A1 8/2014 Hay et al.
2014/0291023 A1* 10/2014 Edbury ................. E21B 44/00
                                                                175/24

FOREIGN PATENT DOCUMENTS

WO    2014160464 A2    10/2014
WO    2015084402 A1    6/2015

* cited by examiner

MONITORING SENSOR AND ACTUATOR HEALTH IN A MUD CIRCULATION SYSTEM

BACKGROUND

Mud circulation systems (e.g., drilling systems) are equipped with various sensors and actuators to monitor and control the drilling mud properties. The sensors and actuators may be communicably coupled to a control system capable of executing the mathematical algorithms, methods, and mud circulation system control described herein. Properly functioning sensors and actuators ensure the quality of drilling mud that circulates between the surface and the well. Current systems rely on operators to identify equipment failures. Due to limited feedback the operators receive from the equipment, analysis of sensor/actuator function may not be prompt and accurate, especially for a large number of sensors/actuators.

BRIEF DESCRIPTION OF THE DRAWINGS

The following figures are included to illustrate certain aspects of the embodiments, and should not be viewed as exclusive embodiments. The subject matter disclosed is amenable to considerable modifications, alterations, combinations, and equivalents in form and function, as will occur to those skilled in the art and having the benefit of this disclosure.

Figure 1:
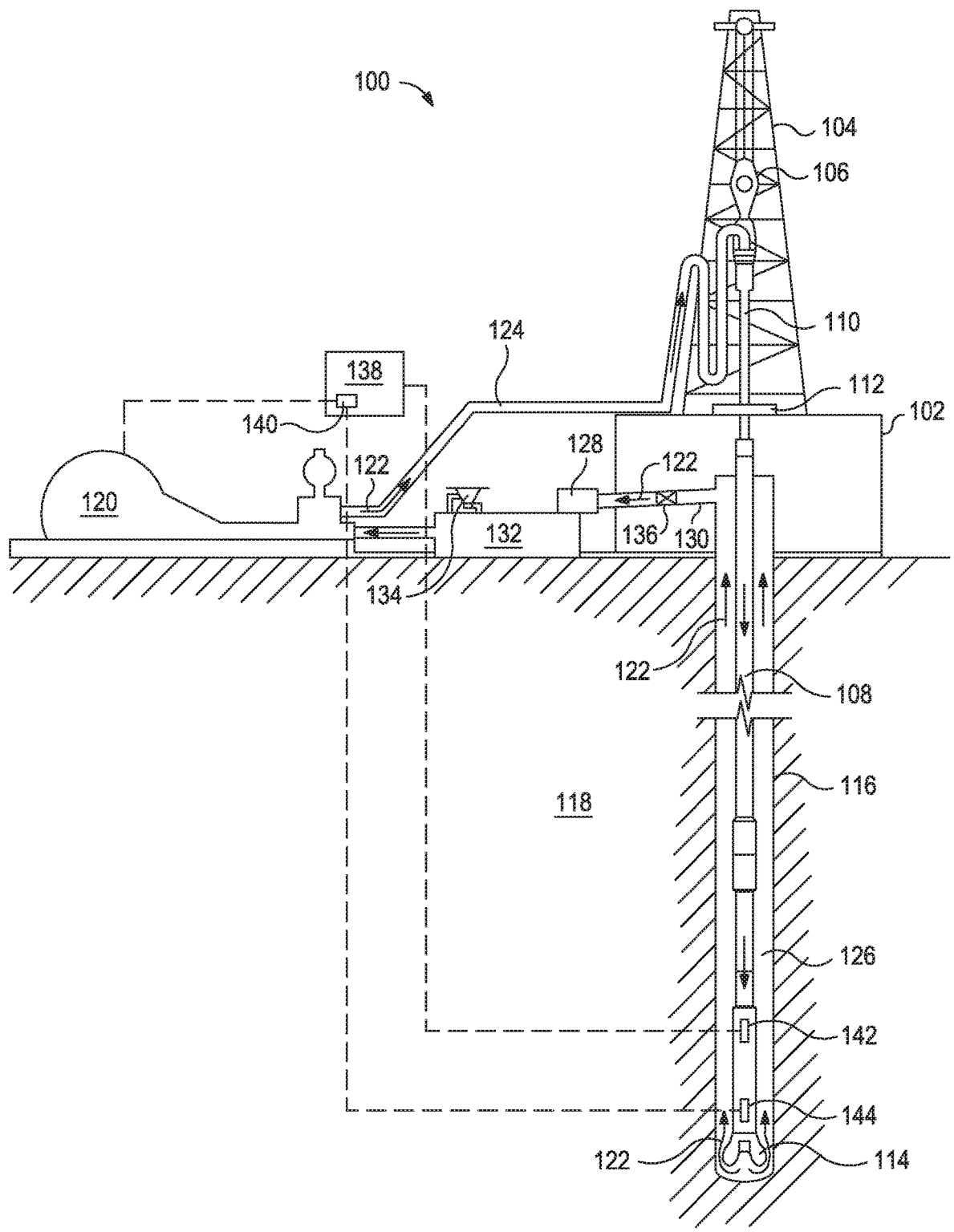
FIG. 1 illustrates an exemplary mud circulation system suitable for implementing the methods described herein.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for enhancing workflow performance in the oil and gas industry. More specifically, the present application relates to monitoring the health and performance of sensors and actuators in mud circulation systems. The methods utilize both direct and virtual components (e.g., sensors and actuators) to achieve a more accurate estimate of the component's performance.

As used herein, the terms "sensor" or "actuator" encompasses both virtual and direct sensors and actuators, respectively, unless otherwise specified. As used herein, the term "direct sensor" refers to a sensor that directly measures the property of interest. As used herein, the term "virtual sensor" refers to an observer (a mathematical model) that estimates a first property of interest based on a measurement of a second property.

FIG. 1 illustrates an exemplary mud circulation system 100 suitable for implementing the methods described herein. While FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the mud circulation system 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates mud 122 through a feed pipe 124 and to the kelly 110, which conveys the mud 122 downhole through the interior of the drill string 108 and out through one or more orifices in the drill bit 114. The mud 122 is then circulated back to the surface via an annulus 126 defined between the drill string 108 and the walls of the borehole 116. At the surface, the recirculated or spent mud 122 exits the annulus 126 and may be conveyed through chokes 136 (also referred to as a choke manifold) to one or more mud cleaning unit(s) 128 (e.g., a shaker, a centrifuge, a hydrocyclone, a separator (including magnetic and electrical separators), a desilter, a desander, a separator, a filter, a heat exchanger, any fluid reclamation equipment, and the like) via an interconnecting flow line 130. After passing through the mud cleaning unit(s) 128, a "cleaned" mud 122 is deposited into a nearby retention pit 132 (e.g., a mud pit or mud tank). While illustrated as being arranged at the outlet of the wellbore 116 via the annulus 126, those skilled in the art will readily appreciate that the mud cleaning unit(s) 128 may be arranged at any location in the mud circulation system 100 to facilitate its proper function, without departing from the scope of the disclosure.

At, before, and/or after the retention pit 132, the drilling system may include one or more mud treatment units. The mud 122 may be treated to change its composition and properties. For example, weighting agents like barite may be added to the mud 122 to increase its density. In another example, base fluid may be added to the mud 122 to decrease its density. In the illustrated mud circulation system 100, the addition of materials to the mud 122 may be achieved with a mixer 134 communicably coupled to or otherwise in fluid communication with the retention pit 132. The mixer 134 may include, but is not limited to, mixers, hoppers, flow paths, and related mixing equipment known to those skilled in the art. In other embodiments, however, the materials may be added to the mud 122 at any location in the mud circulation system 100. In at least one embodiment, for example, there could be more than one retention pit 132, such as multiple retention pits 132 in series. Moreover, the retention pit 132 may be representative of one or more fluid storage facilities and/or units where the materials may be stored, reconditioned, and/or regulated until added to the mud 122.

The various components of the mud circulation system 100 may further include one or more sensors, gauges, pumps, compressors, and the like used store, monitor, regulate, convey, and/or recondition the exemplary muds 122 (e.g., sensors and gauges to measure the composition and/or pressure of the mud, compressors to change the pressure of the mud, and the like).

While not specifically illustrated herein, the disclosed mud circulation system 100 may further include drill collars, mud motors, downhole motors and/or pumps associated with the drill string 108, MWD/LWD tools and related telemetry equipment, sensors or distributed sensors associated with the drill string 108, downhole heat exchangers, valves and corresponding actuation devices, tool seals, packers and other wellbore isolation devices or components, and the like. The mud circulation system 100 may also further include a control system 138 communicably coupled to various components of the mud circulation system 100 (e.g., the mixer 134, a downhole motor 144, the pump 120, sensors 142, and the like) and be capable of executing the mathematical algorithms, methods, and drilling system control described herein.

In some embodiments, virtual sensors 140 may be included as part of the control system 138 or on separate processors that communicate with the control system. For example, the torque of the pump 120 or downhole motor 144 may be received by the virtual sensor 140. Then, virtual sensor 140 may correlate the torque to the viscosity of the drilling fluid.

Additionally, the mud circulation system 100 may optionally include one or more direct sensors 142 coupled to the control system 138. For example, a thermistor for measuring the temperature downhole would be considered a direct sensor. In another example, differential pressure sensors may be placed between an annular space or flow pipe to measure the pressure difference therebetween. In yet another example, a pressure sensor (e.g., a pressure transducer) may be placed downhole in a flow pipe, along the drill string, or in an annular space. Other direct sensors may be pressure sensors, viscosity sensors, fluid flow sensors, and the like.

The present disclosure includes methods and system to accurately and efficiently assess the health and performance of the sensors/actuators in a mud circulation system by utilizing measurements from all available sensors and extracting information regarding a specific sensor/actuator of interest. This may provide a more reliable real-time monitoring at a low cost, since the sensor installation and maintenance costs can be saved by using a virtual sensor. Moreover, fault type of the failure sensor or actuator could be identified if prior knowledge is available from historical data.

Virtual Sensor:

The model used by a virtual sensor incorporates two categories: static model and dynamic model. Both models may be derived from first principles or fitted from the data when there is no fault, or a hybrid model combing both. The static model is described by Equation (1).

$$y = f(u) \qquad \text{Equation (1)}$$

where u can be one or more sensor measurement, and y is the estimated property of interest.

The dynamic model is given by an ordinary differential equation (ODE) or a difference equation to capture the dynamic relationship between the input and output. One example of dynamic model is given by Equation (2), a discrete-time state space model.

$$x(k+1) = Ax(k) + Bu(k) + w(k)$$

$$y(k) = Cx(k) + v(k) \qquad \text{Equation (2)}$$

where the input u(k) denotes sensor measurements (i.e., the second property(s) that is an input to the mathematical model in the virtual sensor definition), the state x(k) represents the internal dynamics, the output y(k) denotes the quantity of interest (i.e., the first property of interest in the virtual sensor definition), w(k) represents the noise or external disturbances applied to the system, and the vector v(k) represents the measurement noise (i.e., the noise of the first property of interest in the virtual sensor definition) and A, B, and C are system matrices that represents the internal dynamics.

One widely-used state observer (i.e., mathematical model) suitable for use in a virtual sensor is a Kalman filter represented by Equation (3).

$$\hat{x}(k+1) = A\hat{x}(k) + Bu(k) + K[y(k) - \hat{y}(k)]$$

$$\hat{y}(k) = C\hat{x}(k) \qquad \text{Equation (3)}$$

where $\hat{x}(k)$ is the estimate of the internal state given information up to time instant k−1, $\hat{y}(k)$ is the one-step-ahead-prediction (i.e., the predicted value of measurement y(k) given information up to time instant k−1), and vector K is the Kalman gain (which determines how much of the prediction error $y(k) - \hat{y}(k)$ is used to corrected the state estimate).

Qualitatively, when the value of K is large, the noise level is small. Conversely, when the value of K is small, the noise level is high. The model uses the value of K to determine how much to rely on the measurement value when correcting the estimated state, where large values of K are more reliable and more heavily weighted by the model. The optimal value of K may be calculated if the noise covariance is known or can be estimated. The Kalman filter also estimates the uncertainty matrices of Equation (2) as illustrated in Equation (4).

$$\Sigma_x(k+1) = A\Sigma_x(k)A^T + W - A\Sigma_x(k)C^T(C\Sigma_x(k)C^T + V)^{-1}C\Sigma_x(k)C^T$$

$$\Sigma_y(k) = h(x(k)) + v(k) \qquad \text{Equation (4)}$$

where $\Sigma_x$ is the uncertainty matrix for state estimate x(k) and $\Sigma_y$ is the uncertainty matrix for output y(k), W and V are covariance matrices for the noise or external disturbances w(k) and measurement noise v(k), respectively, $C^T$ is the transpose of matrix C, and $A^T$ is the transpose of matrix A.

If the system dynamics are highly nonlinear, the system may be represented in a nonlinear form as illustrated in Equation (5) and use nonlinear Kalman filters to estimate the system dynamics as well as the uncertainty matrices.

$$x(k) = f(x(k-1), u(k-1)) + w(k-1)$$

$$y(k) = h(x(k)) + v(k) \qquad \text{Equation (5)}$$

Figure 2:
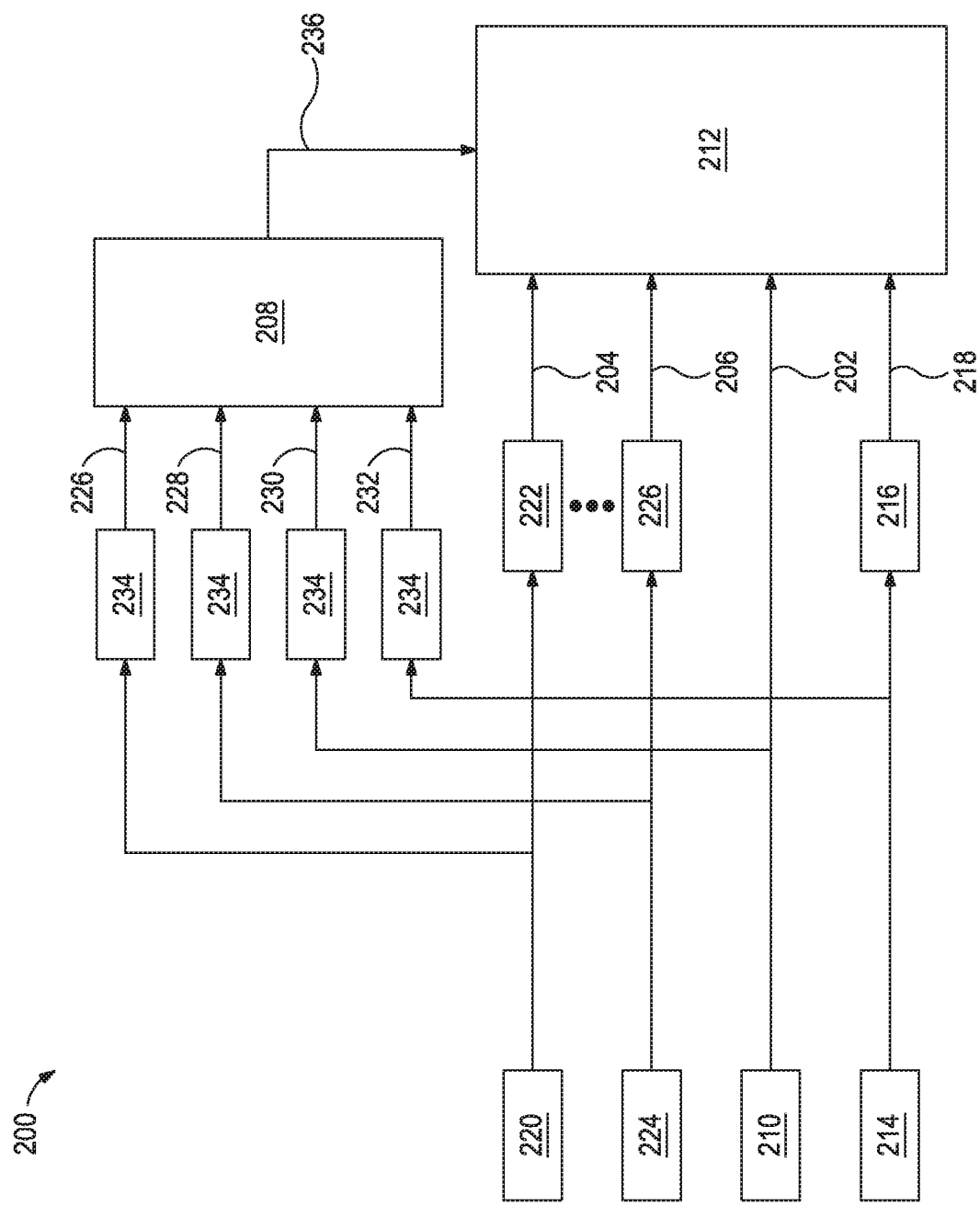
FIG. 2 illustrates sensor and actuator diagnostics with uncertainty bounds.

Model-Based Diagnostics with Uncertainty Bound:

FIG. 2 provides an exemplary diagram of methods 200 for monitoring/diagnosing sensor and actuator behavior 212 using direct sensor measurements 202, model estimates 204,206, and uncertainty bound 236. For example, assuming the mud viscosity is measured at the mud pump, multiple redundancies may be achieved by several methods that employ direct and/or virtual sensors:

1. Install multiple identical sensors 210 to directly measure 202 the viscosity.
2. Measure the mud pump actuator 214 performance and map it to viscosity 218 using a direct model 216.

3. Use sensor measurements 220 from other places such as at mud tank to estimate mud pump viscosity 204 based on a fluid dynamics model 222.
4. Use actuator performance 224 at other locations such as at centrifuge to estimate mud pump viscosity 206 based on a fluid dynamics model 226.

The uncertainty estimates 230,232,226,228 for each of the foregoing redundancies 1, 2, 3, 4, respectively, may be estimated using an uncertainty model 234 (e.g., Equation (4)). Then, an uncertainty synthesis module 208 analyzes all the uncertainty estimates 230,232,226,228 and generates an uncertainty bound 236, which defines a normal behavior envelope for the fluid viscosity at the mud pump. Finally, the resultant measurement values 202,218,204,206 and uncertainty bound 236 may then be used to monitoring/diagnosing sensor and actuator behavior 212 (e.g., using a sensor and actuator diagnostics module). Failed equipment may be identified when a sensor has an abnormal value outside the uncertainty bound.

Figure 3:
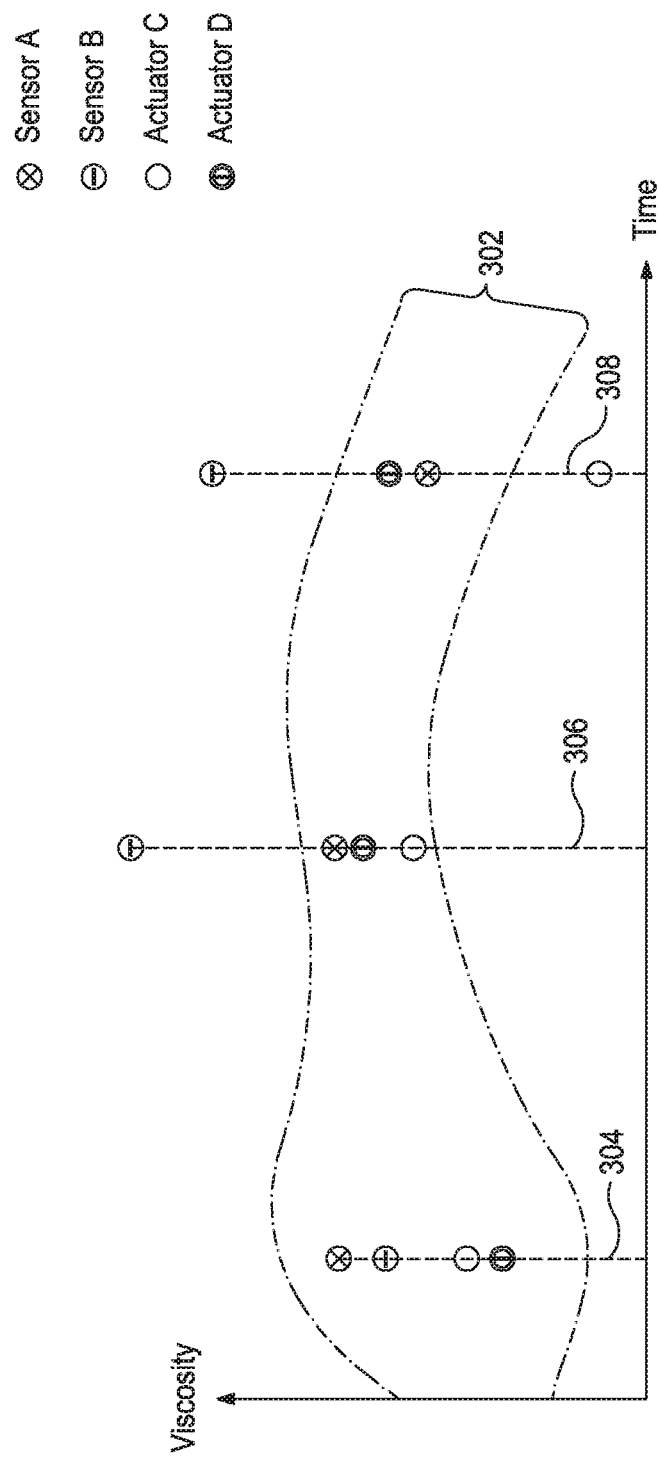
FIG. 3 illustrates sensor and actuator failure identification.

FIG. 3 illustrates a plurality of measurements for four sensors A, B, C, and D at three sampling times 304,306,308 relative to an uncertainty bound 302. Such an analysis may be used to determine if equipment or sensors have failed. For example, sensor B is out of the uncertainty bound 302 twice for the illustrated time frame. This may indicate that sensor B or the equipment sensor B is associated with is failing.

In some embodiments, a failure threshold may be established so that failure detection may be automated. In some instances, a failure threshold may be an absolute number (e.g., four sequential measurements outside the uncertainty bound indicates failure). In some instances, a failure threshold may be an algorithm (e.g., 90% of measurements fall at least 10% outside the uncertainty bound indicates failure). In some instances, a failure threshold may be a moving boundary that is based on operating condition, environmental conditions, or other changing operational parameters. The moving boundary may be calculated before the operation or during the operation as a function of the behavior of the system and may be temporally changing or determined with learning algorithms (e.g., with neural networks and pattern recognition).

Figure 4:
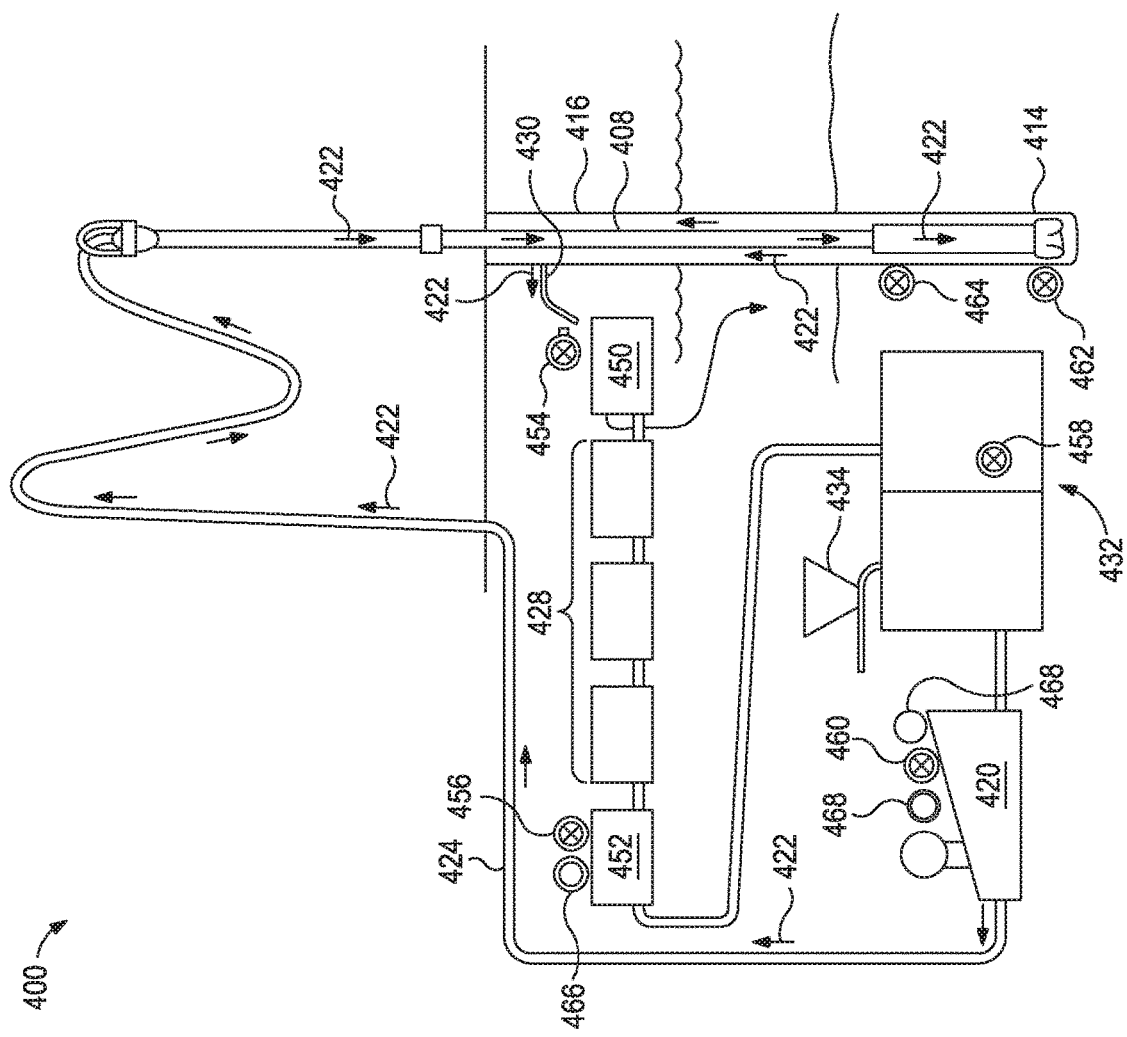
FIG. 4 illustrates another exemplary mud circulation system.

Implementation in a Mud Circulation System:

FIG. 4 illustrates another exemplary mud circulation system 400. The drilling mud circulates per arrows 422 from the wellbore 416 through, in order, mud cleaning components, illustrated specifically as a shale shaker 450, additional mud cleaning components 428 (e.g., additional shakers, de-sanders, di-silters, and the like), a centrifuge 452, a mud pit 432, a mud pump 420, feed pipe 424, the drill string 408, and out the drill bit 414 back into the wellbore 416. The drilling mud lubricates and cools the drill bit 414 and brings rock cuttings back to the surface through the annulus between the drill string 408 and wellbore 416. Drilling mud returning from the wellbore 416 goes through the mud return line 430 to the shale shaker 450. Large solids such as rock cuttings are removed by the shale shaker 450 and finer particles are further removed by the mud cleaning components 428 and the centrifuge 452. "Clean" mud (i.e., drilling mud with a substantial amount of cutting removed) is then stored in the mud pit 432, where chemicals are added to achieve desired fluid properties such as density and viscosity. Retreated mud is then pumped into the wellbore 416 again. In the mud circulation system, multiple temperature, density, viscosity, flow rate, and pressure sensors are installed at different locations including the mud return line 430, shale shaker 450, centrifuge 452, mud pit 432, mud pump 420, choke (not illustrated), feed pipe 424, and several downhole locations. As illustrated, six sensors (454, 456, 458, 460, 462, 464), are located in the mud circulation system 400 at the mud return line 430, centrifuge 452, mud pit 432, mud pump 420, drill bit 414, and drill string 408, respectively. Further, two actuators (466, 468), are located in the mud circulation system 400 at the centrifuge 452 and the mud pit 432, respectively.

The sensors 454-464 and actuators 466-468 may be used to measure the instantaneous change and distribution of the fluid properties. All the sensors 454-464 and actuators 466-468 form a large, integrated network, where the sensor measurement at each node may be used to estimate property of interest at other nodes and provides redundancy for diagnostics. For example, measurements from the sensor 458 at the mud pit 432 in combination with knowing the amount of chemicals added at the mixer 434 may be used to estimate the density and viscosity at the mud pump 420, which means the mud pump 420 has a virtual sensor 468 associated therewith. Then, the measurements of or estimates of density and/or viscosity from the sensor 460, actuator 468, and virtual sensor 468 may be used in a method similar to that illustrated in FIG. 2. Therefore, all nodes (i.e., sensor/actuator locations) are connected by the drilling mud flowing through them and their relationships may be modeled by fluid dynamics or thermal models including time delay.

In some embodiments, the methods described herein may be applied to monitor the performance of sensors and actuators related to mud density and viscosity measurements. Density and viscosity may be directly measured at the mud tank and downhole locations (close to the mud motor and at the bit). However, economic and downhole operational constraints may discourage installing multiple density and viscosity sensors for diagnostics. Instead, measurements at other surface locations may be leveraged to calculate the density or viscosity of interest.

Figure 5:
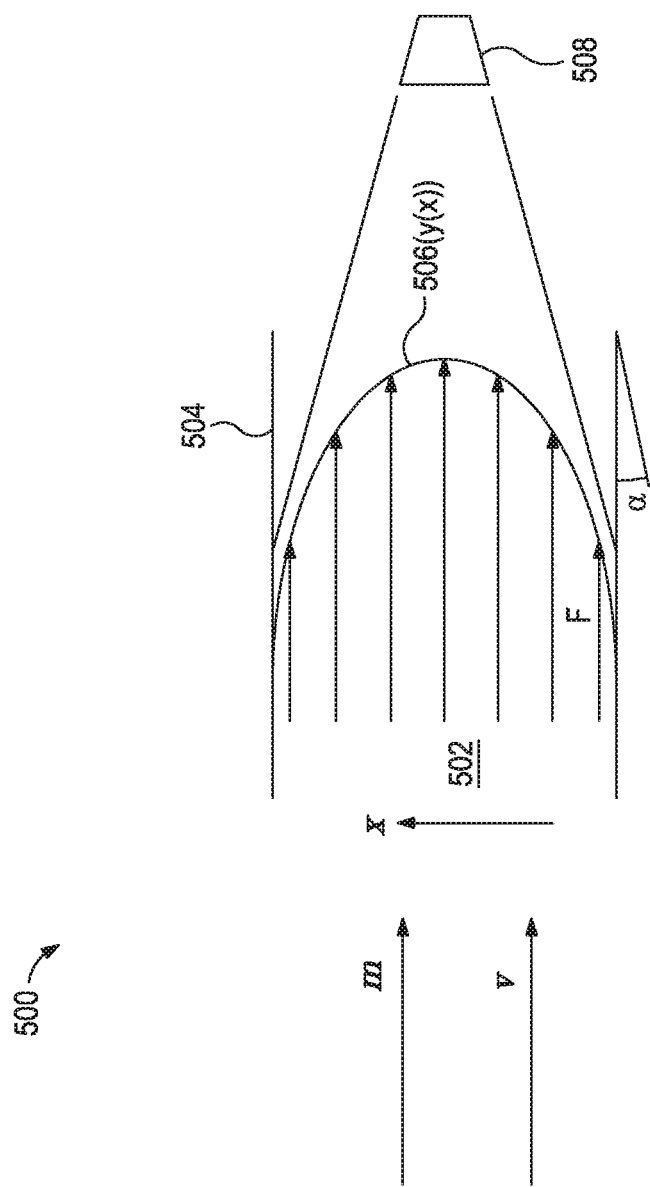
FIG. 5 illustrates a density and viscosity estimation at a shale shaker.

For example, FIG. 5 illustrates a technique 500 that may be implemented at a shale shaker, for example, to estimate fluid density and viscosity using Equation (6). As a fluid 502 travels through a flow path 504, a fluid front profile 506 ((x)) may be captured by a camera 508. Using the shaking bed angle ($\alpha$), drag force (F), mud mass flow rate ($\dot{m}$), and mud volumetric flowrate ($\dot{V}$), Equation (6) may be used to determine estimate fluid density ($\rho_{shaker}$) and viscosity ($v_{shaker}$) at the shaker.

$$\rho_{shaker} = f_{shaker}(\dot{m}, \dot{V})$$

$$v_{shaker} = g_{shaker}(y(x), \alpha, F, \dot{V}) \qquad \text{Equation (6)}$$

In another example, at the centrifuge, density ($\rho_{centrifuge}$) and viscosity ($v_{centrifuge}$) may be estimated per Equation (7) as functions of mud mass flow rate ($\dot{m}$), mud volumetric flow rate ($\dot{V}$), and centrifuge motor power (P).

$$\rho_{centrifuge} = f_{centrifuge}(\dot{m}, \dot{V})$$

$$v_{centrifuge} = g_{centrifuge}(P, \dot{V}) \qquad \text{Equation (7)}$$

In yet another example, at the mud pump, the mud density ($\rho_{pump}$) and viscosity ($v_{pump}$) may be estimated based on based on the volumetric efficiency and the mechanical efficiency of the pump in Equation (8).

$$\text{volumetric efficiency} = \frac{\dot{V}_{in}}{\text{pump stroke} * V_{pump}} \qquad \text{Equation (8)}$$

$$\text{mechanical efficiency} = \frac{P * \text{pump stroke} * V_{pump}}{T_A * \omega_{pump}}$$

where $\dot{V}_{in}$ is the measured inlet volumetric flow rate, $V_{pump}$ is the measured volume per pump stroke, P is the measured pump discharge pressure, $T_A$ is the actual torque delivered to the pump, and $\omega_{pump}$ is the measured pump speed.

Figure 6:
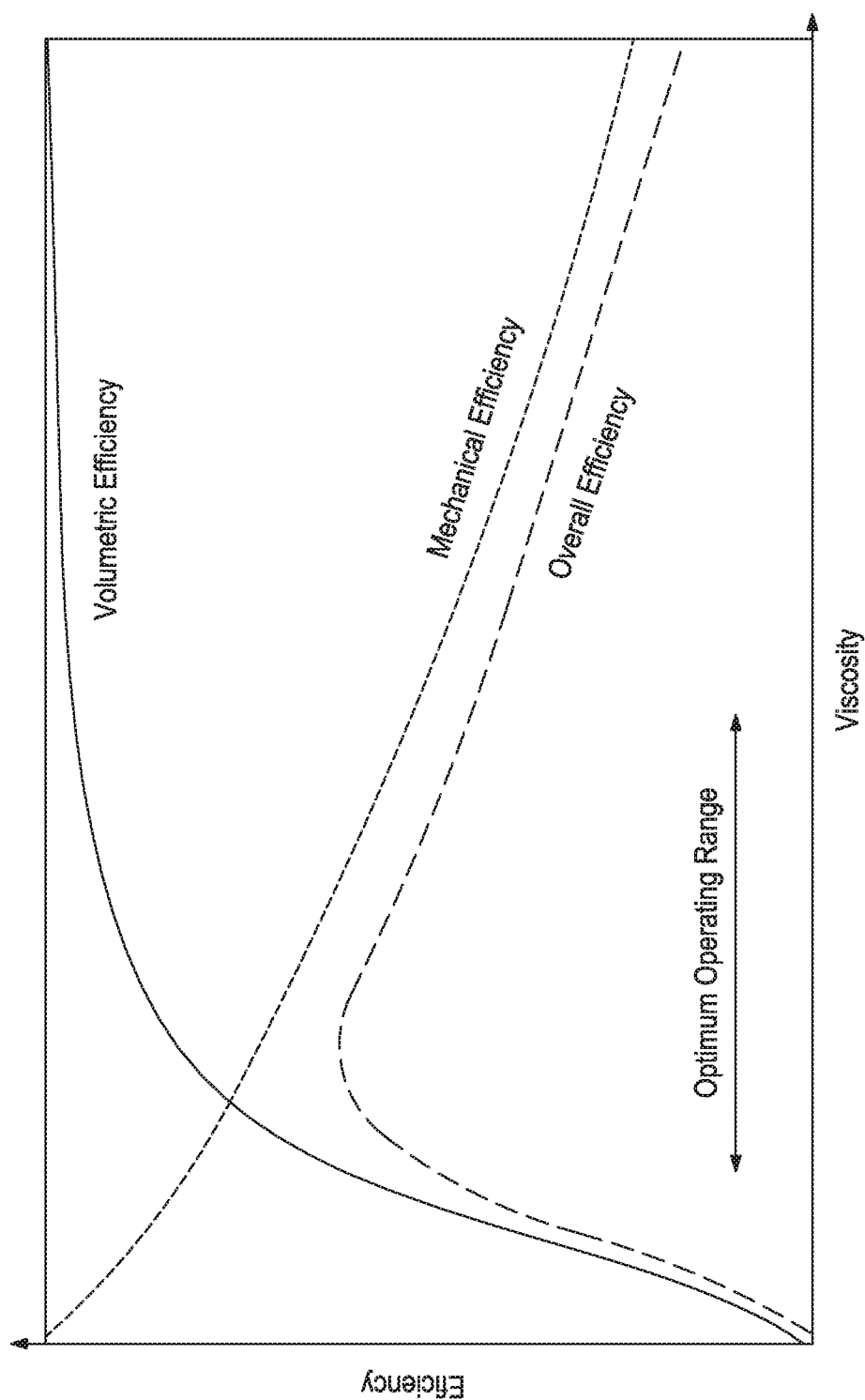
FIG. 6 illustrates the relationship between mud viscosity and pump efficiency.

Generally, pump efficiencies are functions of mud density and viscosity. A typical relationship of viscosity to pump efficiency is shown in FIG. 6. The volumetric efficiency is related to volumetric loss, which is the internal leakage of the pump. For example, with a positive displacement piston pump, which does not use an impeller, volumetric loss may happen between the back surface of the impeller hub plate and the casing, or through other pump components. When viscosity increases, fluids are more difficult to move, thus less volumetric loss and volumetric efficiency increases. The mechanical efficiency is related to mechanical friction. When viscosity increases, there is more friction between fluids and pump parts, thus causing lower mechanical efficiency. Overall efficiency is the product of volumetric and mechanical efficiency. Therefore, for a piston pump, the mud density and viscosity may be estimated/calculated using measurements of flow rate, pump stroke, pump discharge pressure, pump power, pump speed and delivered torque according to Equation (9) or Equation (10). Other equations may be applied for other pumps as would be recognized by those skilled in the art.

$$\rho_{pump1} = f_{pump1}(\text{volumetric efficiency}) = f_{pump1}(\dot{V}_{in}, \text{pump stroke}, V_{pump})$$

$$v_{pump1} = g_{pump1}(\text{volumetric efficiency}) = g_{pump1}(\dot{V}_{in}, \text{pump stroke}, V_{pump}) \quad \text{Equation (9)}$$

$$\rho_{pump2} = f_{pump2}(\text{mechanical efficiency}) = f_{pump2}(P, \text{pump stroke}, V_{pump}, T_A, \omega_{pump})$$

$$v_{pump2} = g_{pump2}(\text{mechanical efficiency}) = g_{pump2}(P, \text{pump stroke}, V_{pump}, T_A, \omega_{pump}) \quad \text{Equation (10)}$$

All the direct measurements or estimations via virtual sensors of mud density and viscosity may then be related by a fluid dynamics model of Equation (11).

$$\begin{bmatrix} \dot{\rho}_{shaker} \\ \dot{\rho}_{centrifuge} \\ \dot{\rho}_{tank} \\ \dot{\rho}_{pump1} \\ \dot{\rho}_{pump2} \\ \dot{\rho}_{mudmotor} \\ \dot{\rho}_{bit} \\ \dot{v}_{shaker} \\ \dot{v}_{centrifuge} \\ \dot{v}_{tank} \\ \dot{v}_{pump1} \\ \dot{v}_{pump2} \\ \dot{v}_{mudmotor} \\ \dot{v}_{bit} \end{bmatrix} = A \begin{bmatrix} \rho_{shaker} \\ \rho_{centrifuge} \\ \rho_{tank} \\ \rho_{pump1} \\ \rho_{pump2} \\ \rho_{mudmotor} \\ \rho_{bit} \\ v_{shaker} \\ v_{centrifuge} \\ v_{tank} \\ v_{pump1} \\ v_{pump2} \\ v_{mudmotor} \\ v_{bit} \end{bmatrix} + Bu \quad \text{Equation (11)}$$

where A is the system matrix, B is the input matrix, and u denotes the input to the system.

Each state represents a measured or estimated density or viscosity. After time discretization, a model in the form of Equation (2) may be obtained and a Kalman filter may be used to estimate the other states if one or more states are available. For example, when interested in the density and viscosity at the bit, one sensor at the bit may be installed, and the measurements at the shale shaker, centrifuge, mud tank, mud pump, and mud motor may be used to calculate six estimations of bit density and viscosity. Thus, at each time step, seven measurements or estimations are available for diagnostics. Failed sensors or actuators will be detected if the corresponding measurement/estimation goes beyond the uncertainty bound. For instance, abnormal mud pump based estimation may suggest that the pump motor is not working properly, while abnormal bit density/viscosity measurement indicates a bit sensor failure.

In some embodiments, several pressure sensors may be installed at the standpipe, gooseneck, choke, and other downhole locations to measure the overall downhole pressure distribution. Surface pressure transducers may compensate for the shortage of downhole pressure sensors and provide an alternative way of sensor diagnostics. These downhole pressure measurements allow for downhole condition monitoring and managed pressure drilling.

Other Diagnostic Methods:

Other than the methods described above, multiple-model-based and statistical approaches may also be applied to monitor the sensor/actuator health and performance. The interacting multiple model (IMM) approach is a multiple-model-based method for detection and diagnostics of sensor and actuator failures. Different from the sensor diagnostics approach described above which is based on a single model, IMM has multiple model candidates in parallel to estimate the system dynamics. As the system dynamics changes (e.g., if a sensor has a failure), IMM could quickly detect the change and transits from a model representing normal behavior to one that reveals a sensor failure.

Figure 7:
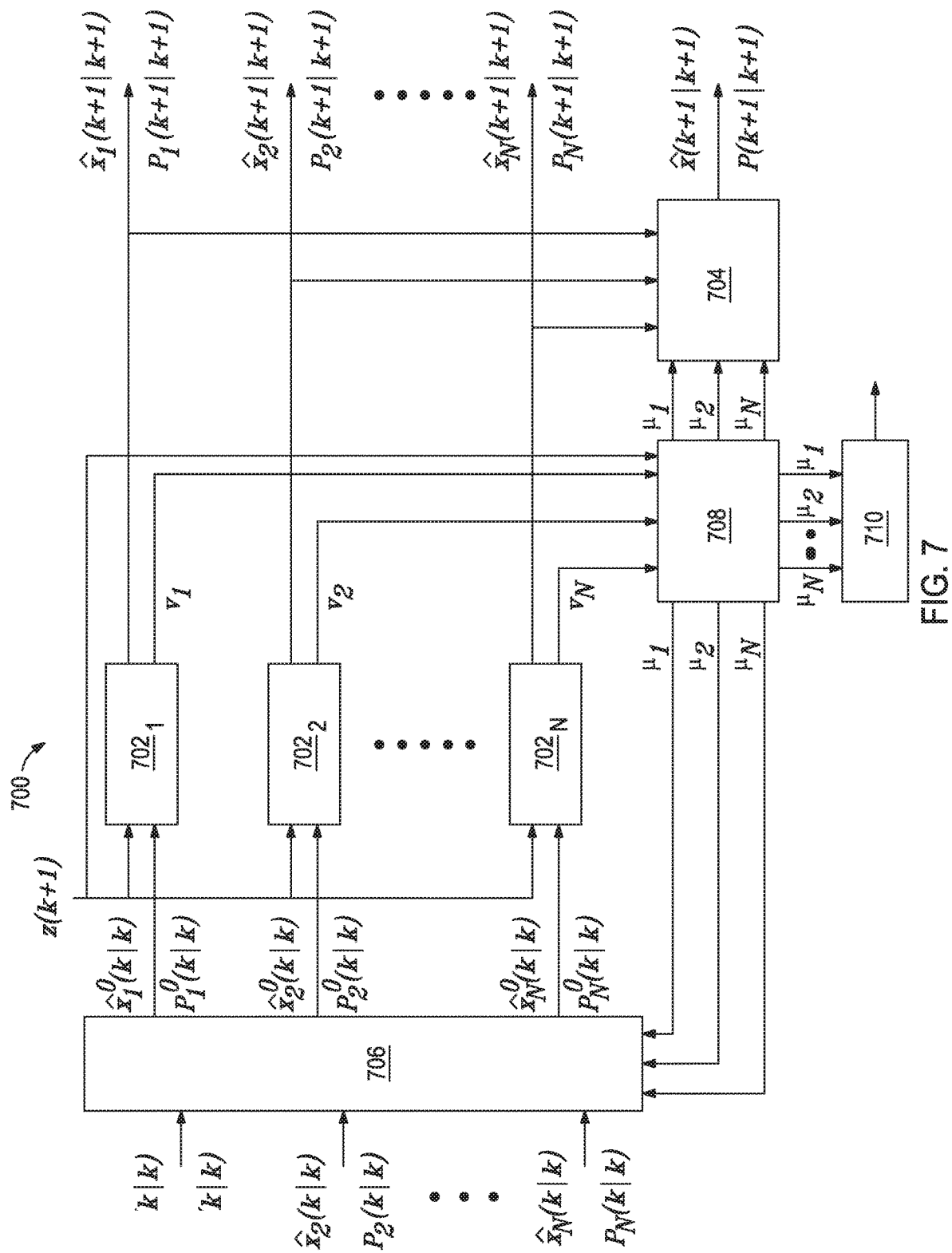
FIG. 7 provides a schematic of an interacting multiple model (IMM) approach for system diagnostics.

For example, FIG. 7 illustrates an exemplary schematic of IMM approach to IMM. A system 700 of independent local model estimates ($\hat{x}_1(k|k) \ldots \hat{x}_N(k|k)$ and $P_1(k|k) \ldots P_N(k|k)$) and their interaction 706 may be built before the job. Each model estimate represents a normal or fault behavior mode and may have totally different dynamics. At each step, a bank of filters $702_1$-$702_N$ corresponding to different models is applied in parallel to their respective mud flow rates ($\dot{m}$) using the current state of internal dynamics ($\hat{x}_1^0(k|k) \ldots \hat{x}_N^0(k|k)$ and $P_1^0(k|k) \ldots P_N^0(k|k)$) and most recent measurement ($z(k+1)$) to produce estimates for the next time step ($\hat{x}_1(k+1|k+1) \ldots \hat{x}_N(k+1|k+1)$ and $P_1(k+1|k+1) \ldots P_N(k+1|k+1)$). Estimation fusion 704 combines the estimates for the next time step in an optimal probability-weighted way to yield the overall estimate for the next time step ($\hat{x}(k+1|k+1)$ and $P(k+1|k+1)$).

Concurrently, the probability ($v_1 \ldots v_N$) of each model in the bank of filters $702_1$-$702_N$ are collected by a model probability update 708, which revises the probabilities ($v_1 \ldots v_N$) according to the most recent measurement ($z(k+1)$) to produce updated probabilities ($\mu_1 \ldots \mu_N$) for each model in the bank of filters $702_1$-$702_N$. The updated probabilities ($\mu_1 \ldots \mu_N$) are then fed back into the bank of filters $702_A$-$702_N$ and applied to their corresponding to different models.

The updated probabilities ($\mu_1 \ldots \mu_N$) are also used by a fault decision module 710 to determine if there is any fault based on probability of each model and estimate of each model.

The uniqueness of this system 700 is that estimates of all filters from previous iteration are mixed and fed to each filter as an initial condition at current iteration, thus all filters are interacting with each other. IMM detects single or multiple failures quickly, accurately and reliably. It is able to estimate a large class of fault conditions including abrupt change or slow drift for any equipment. It can also determine the fault type (sensor, actuator or other components), fault location, size, and occurrence time. However, it requires local models to be created beforehand to cover all system modes.

If comprehensive prior knowledge of the system dynamics is not available or it is difficult to develop accurate models, a statistical approach can be used for system diagnostics. This data driven approach is based on statistical models of system behavior, which reveals the statistical distribution of observed data. Some commonly used statistical models include Gaussian, histograms, mixture of Gaussian, hidden Markov models and Bayesian networks.

Figure 8:
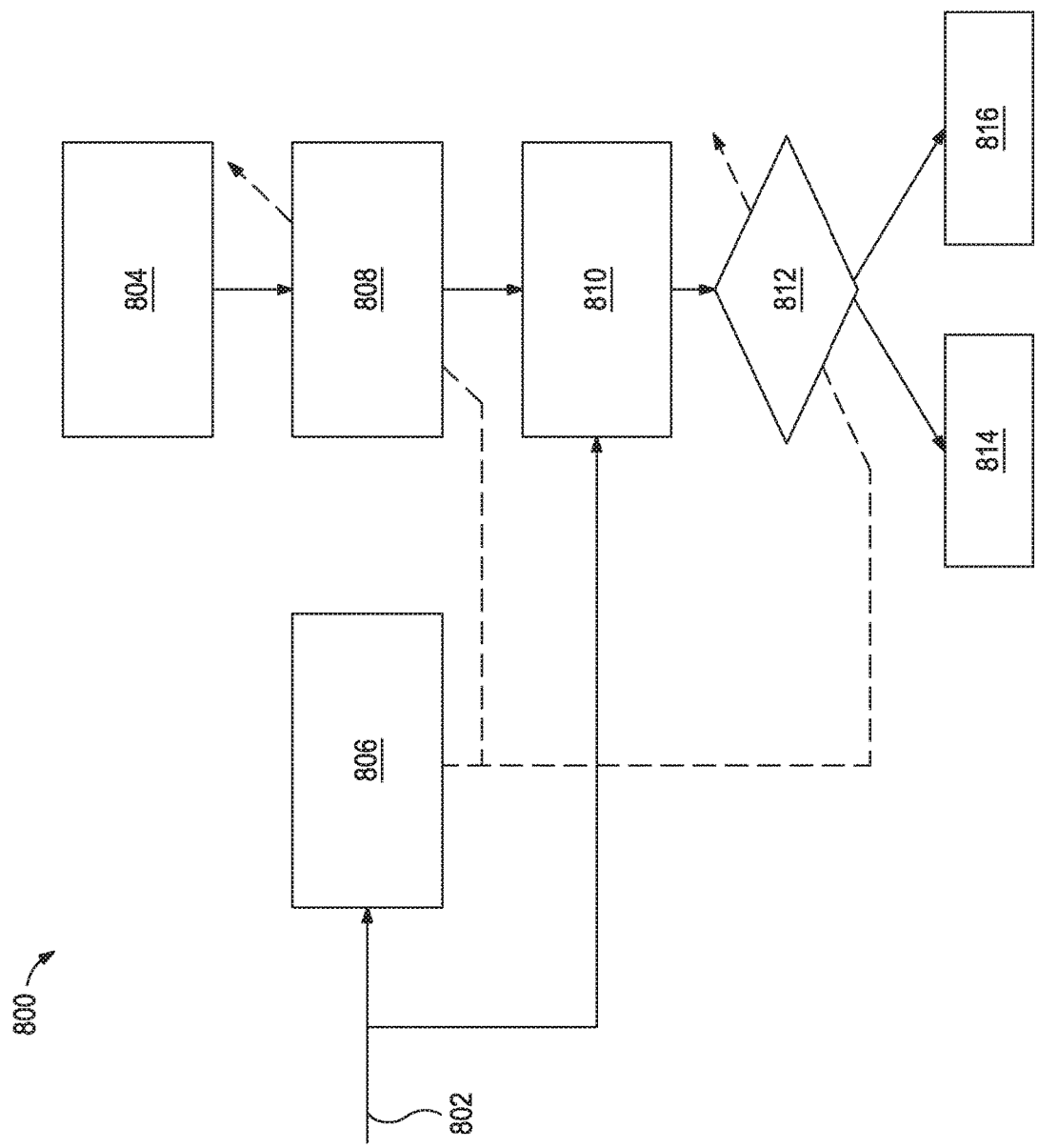
FIG. 8 provides a schematic of a statistical method for system diagnostics.

FIG. 8, for example, illustrates an exemplary method 800 for a statistical approach to system diagnostics. The system observes sensor and actuator data 802 over time and constructs a statistical model 804 of "normality". A model parameter update module 808 in combination with the statistical model 804 is the model used to issue errors. Module 810 determines the probability of failure or sensor faults, and module 812 compares the probability of failure with a threshold and outputs if the data is normal 814 or abnormal 816.

The parameters of the statistical model 808 and the threshold used in module 812 are optimized online by module 806 (illustrated by the dashed lines) so it is able to automatically adapt itself to some new "normal" conditions such as drift. The advantage of the statistical approach is that the data 802 may be historical data and/or real-time data. If using real-time data, it may initially report many false alarms, until the system has gained enough knowledge of normal behavior. Statistical approach is an alternative to model-based method if prior knowledge is not available.

The control system(s) described herein and corresponding computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Some embodiments described herein include a method comprising: measuring or estimating at least one property of a drilling fluid circulating through a mud circulation system (e.g., drilling system) at a plurality of locations along the mud circulation system with a sensor or a virtual sensor at each of the plurality of locations, thereby providing a plurality of location-specific properties; calculating an uncertainty for each of the plurality of location-specific properties; calculating an uncertainty bound based on the uncertainty for each of the plurality of location-specific properties; and identifying the sensor or the virtual sensor corresponding to each of the location-specific properties that falls outside the uncertainty bound. The method may, in some instance, further include: replacing or repairing the sensor or a component of the virtual sensor that falls outside the uncertainty bound.

Some embodiments described herein include a system comprising: a mud circulation system having a drilling fluid circulating therethrough and having a sensor or a virtual sensor at each of a plurality of locations along the mud circulation system that measure a plurality of location-specific properties; a processor communicably coupled to the sensor or the virtual sensor at each of the plurality of locations to receive the plurality of location-specific properties therefrom; the processor including an executable set of instructions to perform a method comprising: calculating an uncertainty for each of the plurality of location-specific properties; calculating an uncertainty bound based on the uncertainty for each of the plurality of location-specific properties; and identifying the sensor or the virtual sensor corresponding to each of the location-specific properties that falls outside the uncertainty bound Embodiments of the present disclosure may include, but are not limited to, Embodiments A, B, and C.

Embodiment A is a method comprising: measuring or estimating at least one property of a drilling fluid circulating through a mud circulation system at a plurality of locations along the mud circulation system with one or more sensors, respectively, at more than one of the plurality of locations, thereby providing more than one location-specific properties; calculating an uncertainty for each of the more than one location-specific properties; calculating an uncertainty bound based on the uncertainty for each of the more than one location-specific properties; and identifying the sensor corresponding to more than one location-specific properties that falls outside the uncertainty bound.

Embodiment B is a system comprising: a mud circulation system having a drilling fluid circulating therethrough and having one or more sensors at each of a plurality of locations along the mud circulation system that measure more than one location-specific properties; a non-transitory computer-readable medium communicably coupled to the one or more sensors at more than one of the plurality of locations to receive the more than one location-specific properties therefrom and encoded with instructions that, when executed, cause the system to perform a method comprising: calculating an uncertainty for each of the more than one location-specific properties; calculating an uncertainty bound based on the uncertainty for each of the more than one location-specific properties; and identifying the sensor corresponding to each of the location-specific properties that falls outside the uncertainty bound.

Embodiment C is a non-transitory computer-readable medium encoded with instructions that, when executed, cause a mud circulation system to perform a method comprising: receiving a measurement of at least one property of a drilling fluid circulating through the mud circulation system from one or more sensors at a plurality of locations along the mud circulation system, thereby providing more than one location-specific properties; calculating an uncertainty for each of the more than one location-specific properties; calculating an uncertainty bound based on the uncertainty for each of the more than one location-specific properties; and identifying the sensor corresponding to each of the location-specific properties that falls outside the uncertainty bound.

Each of Embodiments A-C may optionally include one or more of the following: Element 1: wherein the one or more sensors comprise one or more virtual sensors; Element 2: Element 1 and wherein the at least one property comprises density of the drilling fluid, wherein one of the virtual sensors at a first location of the plurality of locations estimates the density at the first location using a fluid dynamics model based on the density at a second location of the plurality of locations; Element 3: Element 2 and wherein the first location is a downhole location within the mud circulation system and the second location is a surface location within the mud circulation system; Element 4: Element 2 and wherein the first location is at a mud pump or a centrifuge of the mud circulation system and the second location is at the mud tank of the mud circulation system; Element 5: Element 1 and wherein the at least one property comprises viscosity of the drilling fluid, wherein one of the virtual sensors at a first location of the plurality of locations estimates the viscosity at the first location using a fluid dynamics model based on the viscosity at a second location of the plurality of locations; Element 6: Element 5 and wherein the first location is a downhole location within the mud circulation system and the second location is a surface location within the mud circulation system; Element 7: Element 5 and wherein the first location is at a mud pump or a centrifuge of the mud circulation system and the second location is at the mud tank of the mud circulation system; and Element 8: the method further comprising: replacing or repairing the sensor that falls outside the uncertainty bound. Exemplary combinations may include, but are not limited to, Element 8 in combination with one or more of Elements 2-7; Elements 1 and 2 in combination with Elements 3 and 4; Elements 1 and 5 in combination with Elements 6 and 7; and Element 1 in combination with Element 2 (optionally also one or both of Elements 3 and 4) and Element 5 (optionally also one or both of Elements 6 and 7).

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   measuring or estimating at least one property of a drilling fluid circulating through a mud circulation system at a plurality of locations along the mud circulation system with one or more sensors, respectively, at more than one of the plurality of locations, thereby providing more than one location-specific properties;
   calculating an uncertainty for each of the more than one location-specific properties;
   calculating an uncertainty bound based on the uncertainty for each of the more than one location-specific properties; and
   identifying the sensor corresponding to more than one location-specific properties that falls outside the uncertainty bound.

2. The method of claim 1, wherein the one or more sensors comprise one or more virtual sensors.

3. The method of claim 2, wherein the at least one property comprises density of the drilling fluid, wherein one of the virtual sensors at a first location of the plurality of locations estimates the density at the first location using a fluid dynamics model based on the density at a second location of the plurality of locations.

4. The method of claim 3, wherein the first location is a downhole location within the mud circulation system and the second location is a surface location within the mud circulation system.

5. The method of claim 3, wherein the first location is at a mud pump or a centrifuge of the mud circulation system and the second location is at the mud tank of the mud circulation system.

6. The method of claim 2, wherein the at least one property comprises viscosity of the drilling fluid, wherein one of the virtual sensors at a first location of the plurality of locations estimates the viscosity at the first location using a fluid dynamics model based on the viscosity at a second location of the plurality of locations.

7. The method of claim 6, wherein the first location is a downhole location within the mud circulation system and the second location is a surface location within the mud circulation system.

8. The method of claim 6, wherein the first location is at a mud pump or a centrifuge of the mud circulation system and the second location is at the mud tank of the mud circulation system.

9. The method of claim 1 or 2 further comprising: replacing or repairing the sensor that falls outside the uncertainty bound.

10. A system comprising:
    a mud circulation system having a drilling fluid circulating therethrough and having one or more sensors at each of a plurality of locations along the mud circulation system that measure more than one location-specific properties;
    a non-transitory computer-readable medium communicably coupled to the one or more sensors at more than one of the plurality of locations to receive the more than one location-specific properties therefrom and encoded with instructions that, when executed, cause the system to perform a method comprising:
       calculating an uncertainty for each of the more than one location-specific properties;
       calculating an uncertainty bound based on the uncertainty for each of the more than one location-specific properties; and
       identifying the sensor corresponding to each of the location-specific properties that falls outside the uncertainty bound.

11. The system of claim 10, wherein the one or more sensors comprises one or more virtual sensors.

12. The system of claim 11, wherein the at least one property comprises density of the drilling fluid, wherein one of the virtual sensors at a first location of the plurality of locations estimates the density at the first location using a fluid dynamics model based on the density at a second location of the plurality of locations.

13. The system of claim 12, wherein the first location is a downhole location within the mud circulation system and the second location is a surface location within the mud circulation system.

14. The system of claim 12, wherein the first location is at a mud pump or a centrifuge of the mud circulation system and the second location is at the mud tank of the mud circulation system.

15. The system of claim 11, wherein the at least one property comprises viscosity of the drilling fluid, wherein one of the virtual sensors at a first location of the plurality of locations estimates the viscosity at the first location using a fluid dynamics model based on the viscosity at a second location of the plurality of locations.

16. The system of claim 15, wherein the first location is a downhole location within the mud circulation system and the second location is a surface location within the mud circulation system.

17. The system of claim 15, wherein the first location is at a mud pump or a centrifuge of the mud circulation system and the second location is at the mud tank of the mud circulation system.

18. A non-transitory computer-readable medium encoded with instructions that, when executed, cause a mud circulation system to perform a method comprising:
    receiving a measurement of at least one property of a drilling fluid circulating through the mud circulation system from one or more sensors at a plurality of locations along the mud circulation system, thereby providing more than one location-specific properties;
    calculating an uncertainty for each of the more than one location-specific properties;
    calculating an uncertainty bound based on the uncertainty for each of the more than one location-specific properties; and
    identifying the sensor corresponding to each of the location-specific properties that falls outside the uncertainty bound.

19. The non-transitory computer-readable medium of claim 18, wherein the one or more sensors comprises one or more virtual sensors.

* * * * *